US008566544B2

(12) United States Patent
Gustafsson et al.

(10) Patent No.: US 8,566,544 B2
(45) Date of Patent: Oct. 22, 2013

(54) COMPILER-ENFORCED AGENT ACCESS RESTRICTION

(75) Inventors: Niklas Gustafsson, Redmond, WA (US); Artur Laksberg, Redmond, WA (US); Joshua D. Phillips, Seattle, WA (US); John J. Duffy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 12/649,252

(22) Filed: Dec. 29, 2009

(65) Prior Publication Data

US 2011/0161610 A1    Jun. 30, 2011

(51) Int. Cl.
*G06F 12/00*   (2006.01)
*G06F 9/46*    (2006.01)

(52) U.S. Cl.
USPC .......................................... 711/163; 718/102

(58) Field of Classification Search
None
See application file for complete search history.

(56) References Cited

U.S. PATENT DOCUMENTS

| | | | |
|---|---|---|---|
| 5,175,851 A | 12/1992 | Johnson et al. | |
| 5,375,215 A | 12/1994 | Hanawa et al. | |
| 5,454,108 A | 9/1995 | Devarakonda et al. | |
| 5,459,871 A | 10/1995 | Van Den Berg | |
| 5,682,537 A | 10/1997 | Davies et al. | |
| 6,009,269 A | 12/1999 | Burrows et al. | |
| 6,092,156 A | 7/2000 | Schibinger et al. | |
| 6,601,120 B1 | 7/2003 | Schimmel | |
| 6,817,009 B2 | 11/2004 | Flanagan et al. | |
| 7,165,150 B2 | 1/2007 | Alverson et al. | |
| 7,188,344 B1 | 3/2007 | Blue | |
| 7,316,005 B2 | 1/2008 | Qadeer et al. | |
| 7,469,403 B2 | 12/2008 | Choi et al. | |
| 8,316,369 B2 | 11/2012 | Laksberg et al. | |
| 2004/0205392 A1 | 10/2004 | Wu | |
| 2008/0077922 A1 | 3/2008 | Doring | |
| 2008/0209433 A1 | 8/2008 | McKenney | |
| 2009/0193417 A1 | 7/2009 | Kahlon | |
| 2009/0328047 A1 | 12/2009 | Li et al. | |
| 2011/0161604 A1 | 6/2011 | Laksberg et al. | |
| 2011/0161962 A1* | 6/2011 | Laksberg et al. | ............. 718/102 |

FOREIGN PATENT DOCUMENTS

WO    WO2005043388 A1    5/2005

OTHER PUBLICATIONS

Thought Exercise: Axum + F#: Isolation, Agents, and Message-passing in .Net—Published Date: Mar. 31, 2009 http://blogs.msdn.com/maestroteam/ (26 pages).

(Continued)

*Primary Examiner* — Hyun Nam
(74) *Attorney, Agent, or Firm* — Workman Nydegger (57) ABSTRACT

A compiler that enforces, at compile time, domain data access permissions and/or agent data access permissions on at least one agent to be created within a domain. The compiler identifies domain data of a domain to be created, and an agent to be created within the domain at runtime. The domain access permissions of the agent are also identified. As part of compilation of an expression of an agent, a H reference to the domain data is identified. Then, the compiler evaluates an operation that the reference to the domain data would impose on the domain data upon evaluating the expression at runtime. The compiler then determines whether or not the operation is in violation of the domain access permissions of the agent with respect to the identified domain data. Agent data access may also be evaluated depending on whether the access occurs by a function or a method.

20 Claims, 6 Drawing Sheets

(56) References Cited

OTHER PUBLICATIONS

Stork et al., Concurrency by Default Using Permissions to Express Dataflow in Stateful Programs—Published Date: Oct. 25-29, 2009 http://www.cs.cmu.edu/~aldrich/papers/onward2009-concurrency.pdf (8 pages).

Isolation in Maestro: Isolation, Agents, and Message-passing in .Net—Published Date: 2009 http://blogs.msdn.com/maestroteam/archive/2009/02/27/isolation-in-maestro.aspx (7 pages).

Axum, Microsoft's Approach to Parallelism—Published Date: Apr. 23, 2009 http://www.infoq.com/news/2009/04/Axum (2 pages).

Greenhouse et al, Assuring and Evolving Concurrent Programs: Annotations and Policy—Published Date: May 19-25, 2002http://fluid.cs.cmu.edu:8080/Fluid/fluid-publications/p453-greenhouse.pdf (11 pages).

Taming Your Sequence's Side-Effects through IEnumerable.Let—Published Date: Sep. 12, 2009 http://bartdesmet.net/blogs/bart/archive/2009/09/12/taming-your-sequence-s-side-effects-through-ienumerable-let.aspx (20 pages).

Kieburtz, Taming Effects with Monadic Typing1—Published Date: 1998 http://delivery.acm.org/10.1145/290000/289428/p51-kieburtz.pdf?key1=289428&key2=9659755521&coll=GUIDE&dl=GUIDE&CFID=56555689&CFTOKEN=92779120 (12 pages).

Andrade et al., Software Synthesis from Dataflow Models for G and LabVIEW—Published Date Mar. 16, 1998 http://users.ece.utexas.edu/~bevans/courses/ee382c/projects/spring98/andrade-kovner/litsurvey.pdf (9 pages).

Ha et al., Compile-Time Scheduling of Dynamic Constructs in Dataflow Program Graphs, IEEE Transactions of Computers, vol. 46, No. 7, Published Date: Jul. 1997 http://ptolemy.eecs.berkeley.edu/publications/papers/97/compile/compile.pdf (12 pages).

Munnich, PRED-DF—A Data Flow Based Semantic Concurrency Control Protocol for Real-Time Main-Memory Database Systems—Published Date: 2000 http://ieeexplore.ieee.org/stamp/stamp.jsp?tp=&arnumber=896428&isnumber=19358 (5 pages).

Cox et al., Adding Parallelism to Visual Data Flow Programs—Published Date—2005 http://users.cs.dal.ca/~arc/publications/2-36/paper.pdf (10 pages).

Templ et al., Lock-Free Synchronization of Data Flow between Time-Triggered and Event-Triggered Activities in a Dependable Real-Time System—Retrieved Date: Oct, 14, 2009 http://embeddedcmmi.at/fileadmin/src/docs/publications/C088.pdf (6 pages).

Leung et al., Data Race: Tame the Beast,—Published Date: 2009 http://www.cs.otago.ac.nz/research/publications/oucs-2009-01.pdf (11 pages).

Nienaltowski, Efficient Data Race and Deadlock Prevention in Concurrent Object-Oriented Programs—Published Date: 2004 http://se.inf.ethz.ch/people/nienaltowski/papers/oopsla04.pdf (2 pages).

Office Action dated Apr. 10, 2012 U.S. Appl. No. 12/649,254 (Copy Attached).

Notice of Allowance dated Aug. 8, 2012 U.S. Appl. No. 12/649,254 (Copy Attached).

Office Action dated Jun. 20, 2013 cited in U.S. Appl. No. 12/649,255.

* cited by examiner

COMPILER-ENFORCED AGENT ACCESS RESTRICTION

BACKGROUND

Computing systems obtain a high degree of functionality by executing software programs. Programs consist of computer-executable instructions that are kept in some persistent form, such as on a harddrive, a compact disk, a thumbdrive, flash memory, or the like. During execution, such computer-executable instructions may often be loaded in volatile memory, and executed by one or more processors of the computing system, causing the computing system to perform tasks.

Computing systems that have multiple processors or multiple processor cores often partition the program into multiple concurrently executing tasks. Such concurrent execution can improve responsiveness and processing efficiency, but concurrent execution can result in different tasks trying to access the same data (known as "shared state") in the computing system.

However, unrestricted access to shared state can lead to problems that are hard to detect, reproduce and solve. Among these problems are data races. A data race is a situation where a task can observe an invalid state of an object in memory, while another task is at the same time mutating the state of that object. Exploiting the benefits of concurrency while avoiding data races has historically been a hard problem to solve.

BRIEF SUMMARY

At least one embodiment described herein relates to a compilation that enforces, at compile time, domain data access permissions on at least one agent to be created within a domain. The compiler identifies domain data of a domain to be created at runtime, and also identifies an agent to be created within the domain at runtime. The domain access permissions of the agent are also identified with respect to the identified domain data. As part of compilation of an expression of an agent, a reference to the domain data is identified. Then, the compiler evaluates an operation that the reference to the domain data would impose on the domain data upon evaluating the expression at runtime. The compiler then determines whether or not the operation is in violation of the domain access permissions of the agent with respect to the identified domain data.

Alternatively or in addition, the compiler may enforce proper access to agent data depending on whether the expression is within an agent function or agent method. The compiler identifies a domain to be created at runtime, identifies an agent to be created within the domain at runtime, and identifies agent data of the agent. In order to compile an expression, the compiler then determines whether the expression occurs within a function or a method. The compiler accesses a reference to the agent data within the expression. The compiler then evaluates an operation that the reference to the agent data would impose on the agent data upon evaluating the expression at runtime. Then, the compiler determines whether or not the operation is in violation of access permissions of the with respect to the identified agent data, wherein the access permissions depend on whether the expression occurs within a function or a method.

Thus, an effective method for enforcing domain data and/or agent data at compile time is described. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with at least some embodiments described herein, a compiler enforces domain data access permissions and/or agent data access permissions on at least one agent to be created within a domain. First, some introductory discussion regarding computing systems will be described with respect to FIG. 1. Then, an example domain execution environment will be described with reference to FIGS. 2 and 3. Subsequently, a compiler and operation in accordance with the principles described herein will be described with respect to FIGS. 4 through 6.

Figure 1:
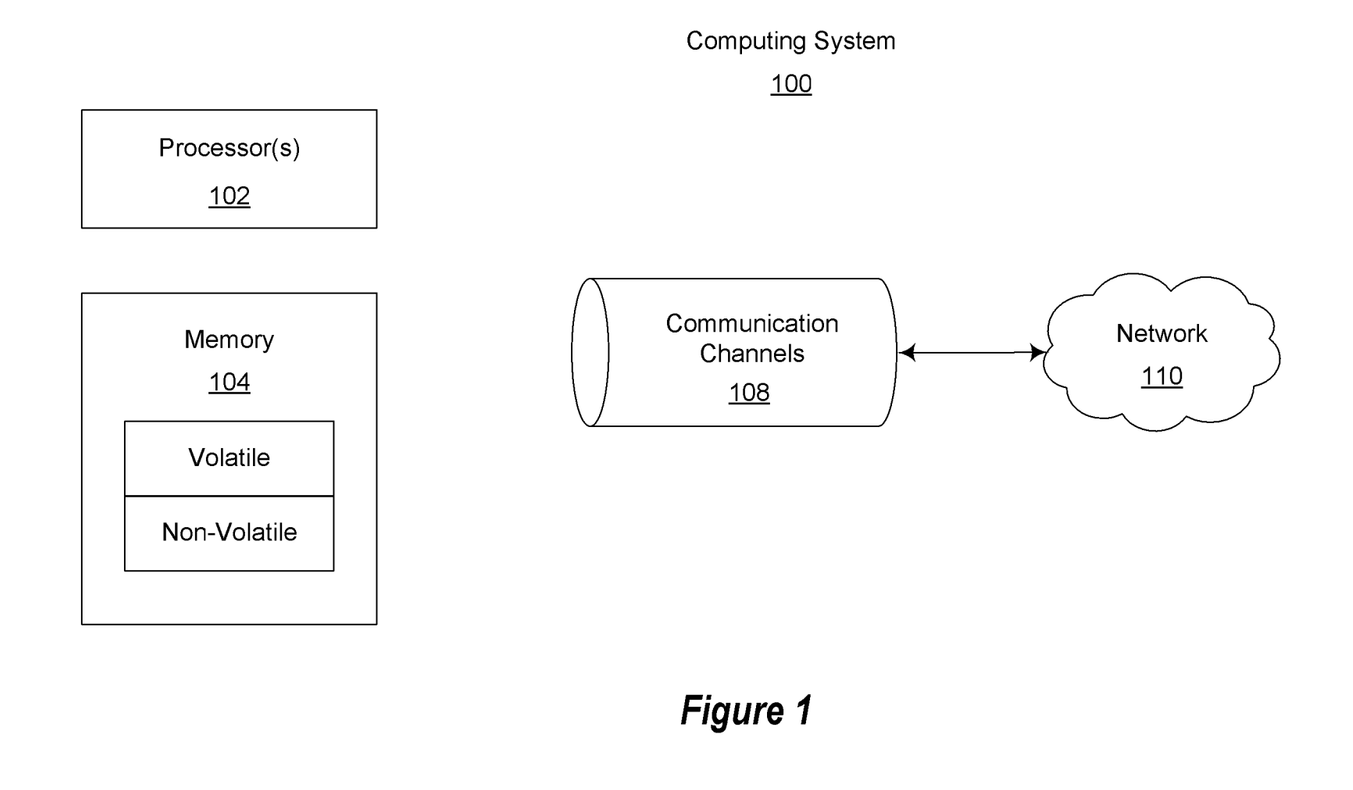
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module"

or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Having described a computing system in accordance with FIG. 1, an example domain execution environment will be described with respect to FIGS. 2 and 3 in which a scheduler schedules execution of one or more agents within the domain.

The agents may be defined as being of different types, with the scheduler taking into consideration the agent's type when performing the scheduling. The principles described herein relate most to the compiler enforcing an agent's operation to be consistent with the type of the agent by estimating, at compile time, what the agent would do at runtime with the code being compiled. However, in order to understanding how the compiler operates to enforce the agent's operation, it will be helpful to first understand an example execution environment of agents within a domain. Accordingly, an example domain execution environment is now described with respect to FIGS. 2 and 3.

Figure 2:
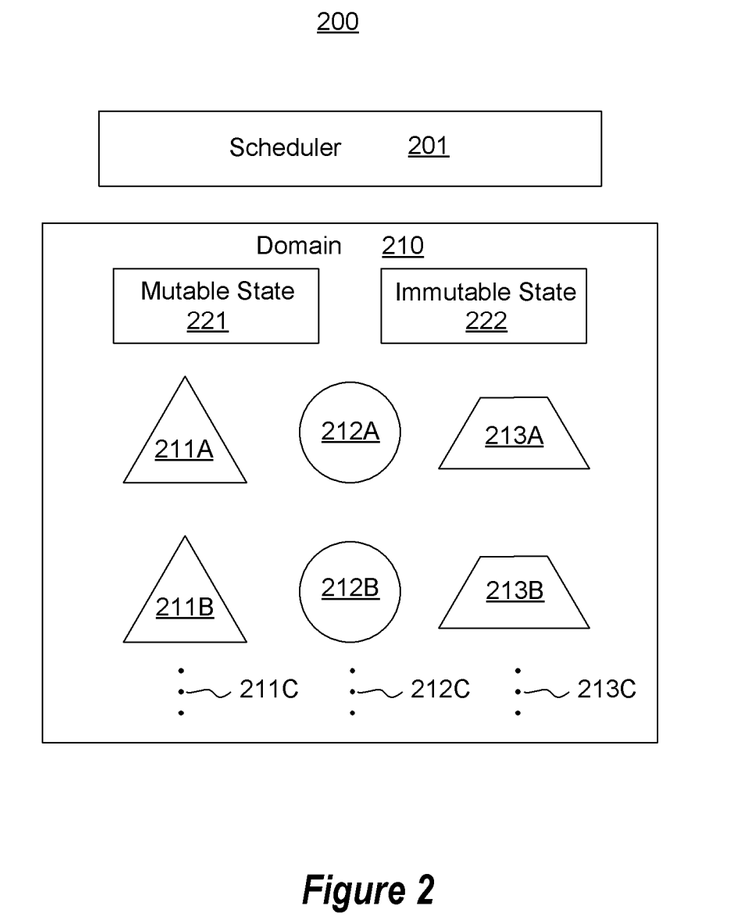
FIG. 2 abstractly illustrates an execution environment that includes a scheduler that schedules execution of various agents within a domain.

FIG. 2 illustrates an environment 200 that includes a scheduler 201 and a domain 210. Though the compiler acts at compilation time, FIGS. 2 and 3 show how agents operate at runtime. The scheduler 201 may be, for example, an in-memory component that is instantiated in response to the execution of one or more computer-executable instructions of a computer program product. The creation of the domain 210 and its various constituent agents 211 through 217 may also be performed in response to the execution of such one or more computer-executable instructions. The operation and potential termination of the scheduler 201, the domain 210, and the constituent agents 211 through 217 may also be performed in response to the execution of such one or more computer-executable instructions.

The domain 210 includes mutable shared state 221 and immutable shared state 222. The mutable shared state 221 is state that may be altered (or mutated) by at least one of the agents that are defined in the domain 210. The immutable shared state 222 is state that may not be altered (i.e., is immutable) by any of the agents that are defined in the domain 210. In one embodiment, although not required, the immutable state 222 may be initialized upon creation of the domain 210.

The domain 210 is illustrated as having three different types of agents, referred to herein as writer agents, general reader agents (sometimes referred to as "reader agents"), and immutable reader agents (sometimes referred to as "no-access agents"). Each of the different types of agents is represented in FIG. 2 as having a different form. For instance, writer agents 211A and 211B are symbolized as triangles, general reader agents 212A and 212B are symbolized as circles, and immutable reader agents 213A and 213B are symbolized as trapezoids.

Although two of each type of agent are illustrated, the ellipses 211C, 212C and 213C illustrated that there may be any number of such agents. For instance, there may even be one or three of more of any of such agents. Furthermore, during execution, there may not always be at least one of each type of agent. For instance, there may be times when there are agents of just one or two of the three agent types running, though the scheduling 201 has the capacity to schedule all three agent types. Although not illustrated, each of the agents, regardless of its type, may have its own internal state that it alone may access freely. In one embodiment, the domains and agents are generated using the Axum programming language, although certainly not required.

Writer agents (such as agents 211A, 211B and 211C) have read access and write access to mutable shared state 221 and have read access to immutable shared state 222. Read access with respect to mutable shared state might include, for example, copying any portion of the mutable shared state into the internal state of the agent (also referred to herein as "agent state") that the agent is free to alter internally. For instance, the agent state might be a local variable of the agent or an instance field of the agent. Similarly, read access with respect to immutable shared state might include copying any portion of the immutable shared state into the internal state of the agent that the agent is free to alter internally. Write access with respect to mutable shared state permits the copying of internal agent state (e.g., a local variable or an instance field) to a particular domain field in the mutable state, or perhaps copying content of mutable or immutable shared state to a domain field of the mutable shared state.

General reader agents (such as agents 212A, 212B and 212C—referred to in the Axum language as "reader agents") have read access to both mutable shared state 221 and immutable shared state 222, and have no write access to any of the shared state 221 or 222. Immutable reader agents (such as agents 213A, 213B and 213C—referred to in the Axum language as "no-access agents") have read access to only immutable shared state 222, and have no write access to any of the shared state 221 or 222. In one embodiment, such as in the Axum programming language, none of the writer agents, general reader agents, or immutable reader agents have any read or write access to any data outside of the domain.

The scheduler 201 is configured to schedule multiple executable agents such as the writer agents, general reader agents, and immutable reader agents. The scheduling is conducted in accordance with a policy. As part of that policy, the scheduler 201 considers the access rights of the agents. While the scheduler 201 may vary from the policy that will now be described, strict adherence to the policy now described permits for the significant reduction or even perhaps elimination of data races.

As for the policy with respect to writer agents, the scheduler 201 ensures that at most one writer agent is accessing a portion of the mutable shared state at any given time. Furthermore, if a writer agent is to access the portion of the mutable shared state, the scheduler prohibits any reader agents from reading that same portion of the shared state. This prevents data races. In one embodiment, if one writer agent is accessing any portion of the mutable shared state, all general reader agents are prohibited from accessing any portion of the mutable shared state, even if they are not trying to access the same mutable shared state.

Even so, immutable reader agents are still permitted to read immutable state regardless of whether there are writer agents having write access to mutable state. Permitting such concurrent read access to immutable reader agents and writer agents does not result in a risk of data races since there is no risk that the immutable state will be changed by the writer agent, the writer agent not having write access to the immutable state. Thus, at least some reader agents (the immutable reader agents) may continue to execute even if there is a writer agent executing, resulting in processing improvements as compared to a policy in which all reader agents are prohibited from executing if a writer agent is executing.

As for the policy with respect to general reader agents, if a writer agent is writing to a particular portion of the mutable shared state, the scheduling prohibits any general reader agent from reading that portion mutable shared state. Once again, in one embodiment, the policy treats the mutable shared state as a whole, such that if the writer agent is accessing any portion of the mutable shared state, the entire mutable shared state is blocked to other general reader agents. If a writer agent is not writing to a portion of the mutable shared states, then the scheduler may schedule one or more general reader agents to access that portion of the mutable shared state. If treating the mutable shared state as a single whole, the scheduler may have one or more general reader agents concurrently executing if there is not a writer agent executing.

As for the policy with respect to immutable reader agents, the immutable reader agents may be permitted read access to any portion of the immutable state. By definition, the reader agents do not read from the mutable shared state. Accordingly, allowing unfettered read access to immutable state does not increase any risk of data races due to the operation of writer agents, general reader agents, or other immutable reader agents.

Stated another way, the policy ensures that for any given portion of the mutable shared state 1) at most one writer agent is accessing the given portion at any given time, 2a) does not allow any reader agents to access the given portion of the mutable shared state if a writer agent is accessing the given portion of the mutable shared state, and 2b) allows one or more reader agents to access the given portion of the mutable shared state if a writer agent is not accessing the given portion of the shared state. With respect to immutable shared state, no agent ever has write access to the immutable shared state, and all agents have read access to the immutable state.

Thus, the scheduler may be a concurrency scheduler that schedules, in some case, multiple agents to be executing concurrently using a scheduling policy that reduces or eliminates the risk of data races.

Figure 3:
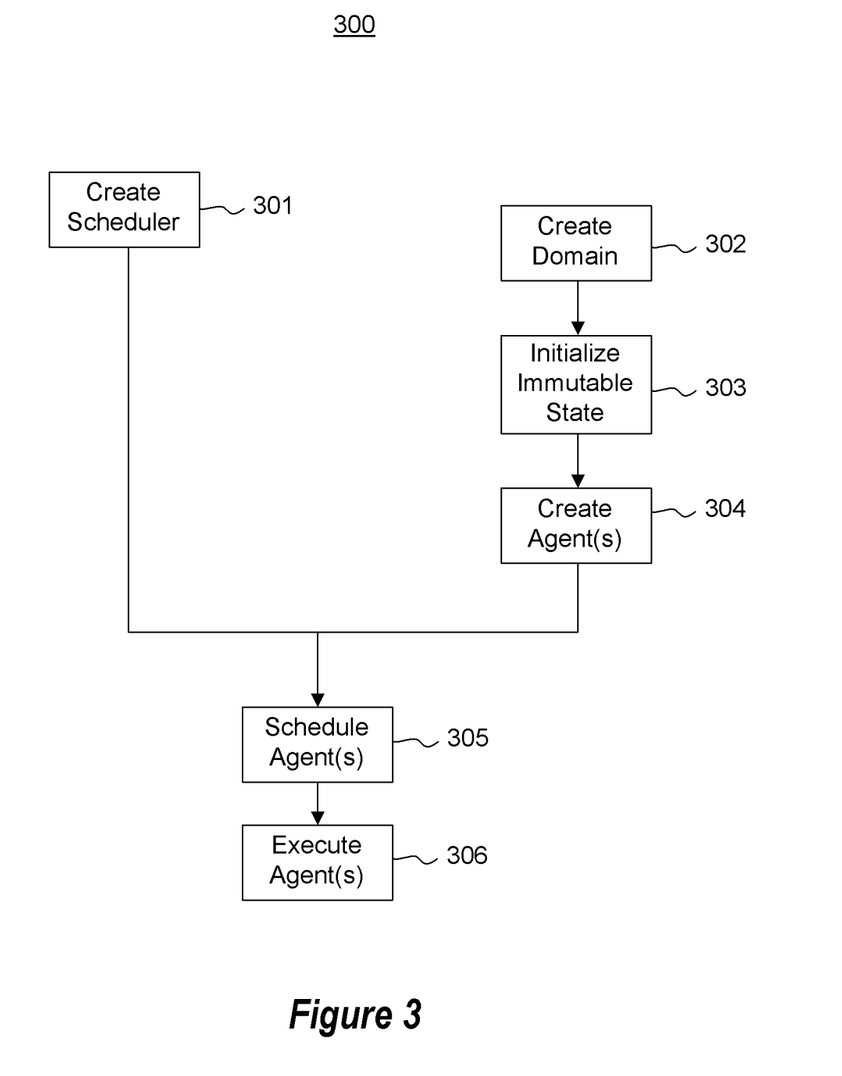
FIG. 3 illustrates a flowchart of a method for scheduling agent execution applied to the environment of FIG. 2.

FIG. 3 illustrates a flowchart of a method 300 for reducing the risk of data races in a computing system. The method 300 may be implemented within, for example, the computing system 100 of FIG. 1. The method 300 creates a scheduler (act 301) (such a scheduler 201 of FIG. 2), and creates a domain (act 302) (such as the domain 210 of FIG. 2). Optionally, upon creation of the domain, the immutable shared state (such as immutable shared state 222 in FIG. 2) is initialized (act 303). As for the mutable shared state, this may be created and edited at some points along the life of the domain. The creation of the domain may be performed in response to computer-executable code.

The domain defines a number of machine-executable agents within the domain, which are created (act 304). For instance, with respect to FIG. 2, the domain 210 defines agents 211A, 211B, 211C, 212A, 212B, 212C, 213A, 213B, and 213C. The scheduler than schedules the agents (act 305) in accordance with a scheduling policy, an example of a portion of which being described above. Other policy considerations might include execution dependencies between agents. For instance, one agent may rely upon the output of execution of another agent. The scheduled agents are executed (act 306) in the order and with the concurrency dictated by the scheduler.

The creation, scheduling, and execution of the agents may be performed continuously, with the scheduling continuously reevaluating the schedule according to policy. Accordingly, as new agents are created, and as execution of old agents completes, the scheduler may allow other agents to execute in accordance with policy.

Having described one example execution environment following a domain/agent model with respect to FIGS. 2 and 3, the principles of having a compiler verify, at compile time, that an agent's operations at run-time will be consistent with the type of agent will now be described with respect to FIGS. 4 through 6. While the compiler verification may operate to verify operation of the agents 211, 212 and 213 to be consistent with their types, the broader principles may be used to verify, at compile time, that an agent acting within a domain is acting appropriately given the type of agent.

Figure 4:
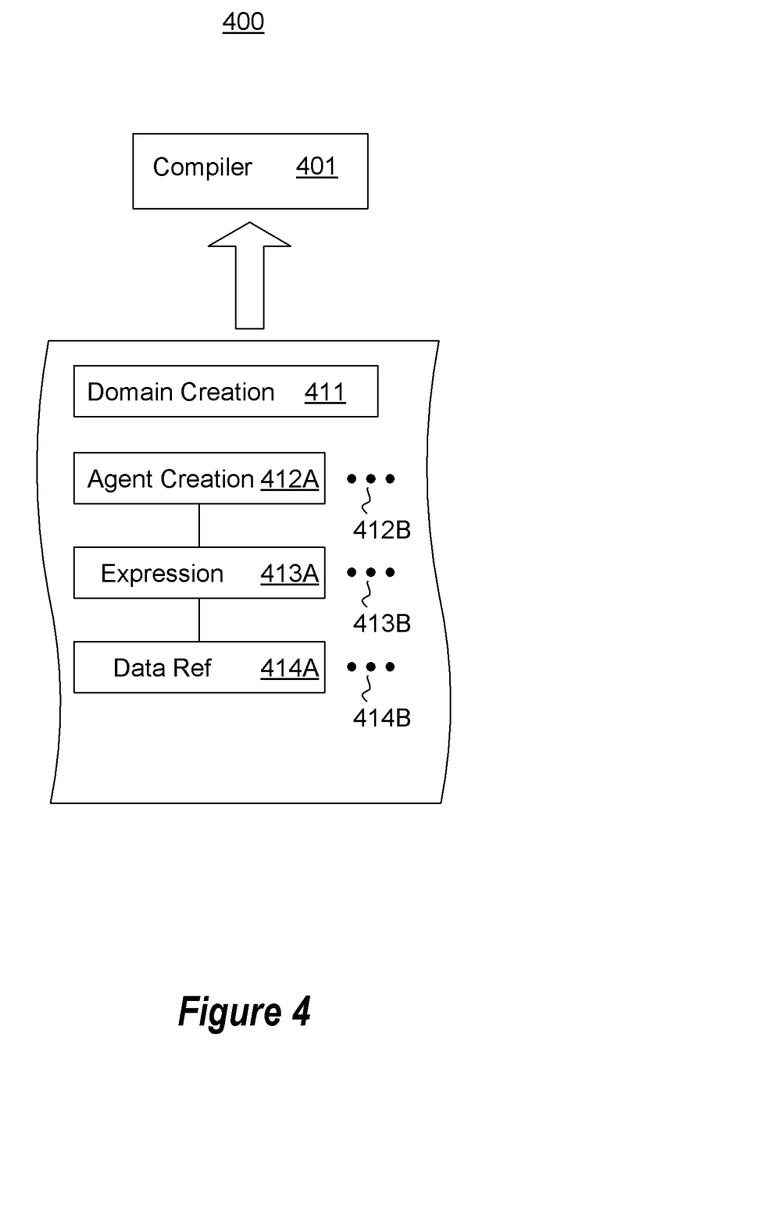
FIG. 4 illustrates a compilation environment in which the principles described herein may be employed.

FIG. 4 illustrates a compilation environment 400 in which a compiler 401 compiles code 402. The compiler 401 may be instantiated in memory of a computing system executing computer-executable instructions that are stored on one or more computer-readable media that are contained within a computer program product. For instance, the compiler 401 may be instantiated in the memory 104 of the computing system 100 of FIG. 1 in response to computer-executable instructions being executed by the processing unit(s) 102 of the computing system 100. The code 402 may be source code or intermediate code.

The code 402 includes a domain creation reference 411 that, when the corresponding binary is executed, causes the creation of a domain. The code 402 also includes an agent creation reference 412A that, when the corresponding compiled instructions are executed at runtime, causes an agent to be created. The ellipses 412B represents that there may be one, two or more agent creations associated within a domain. The code includes an expression 413A of the agent 412A, with the ellipses 413B representing that there may be more than one expression of the agent 412A. The expression 413A includes a data reference 414A, with the ellipses 414B representing that there may be more than one data reference within the expression 413A.

Thus, each domain may have one or more agents. Each agent may have one or more expressions. Each expression may have one or more data references. The data reference may refer to domain data in the example of FIG. 5, or may reference agent data in the example of FIG. 6.

Figure 5:
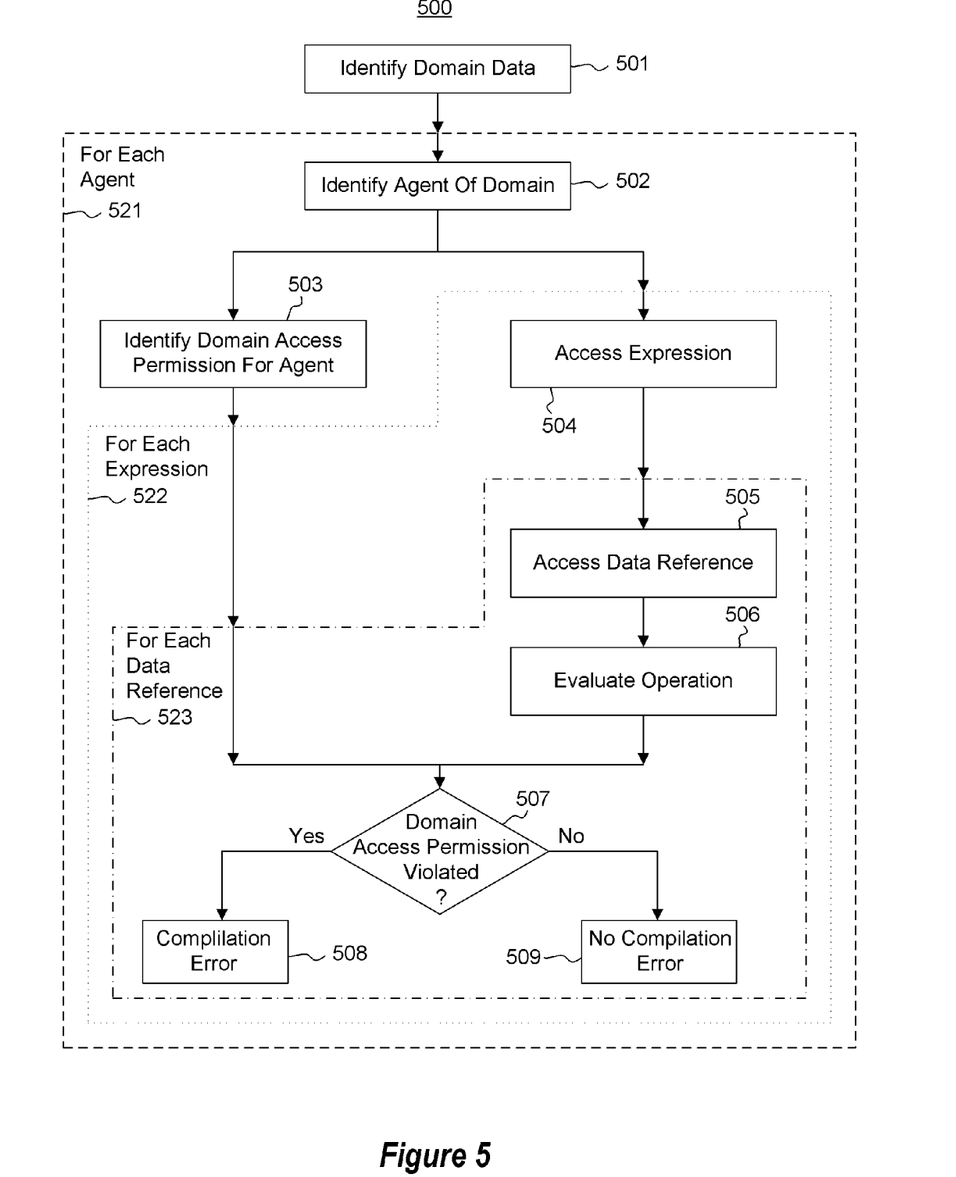
FIG. 5 illustrates a flowchart of a method for determining whether a reference to domain data in an agent expression represents a compilation error.
Figure 6:
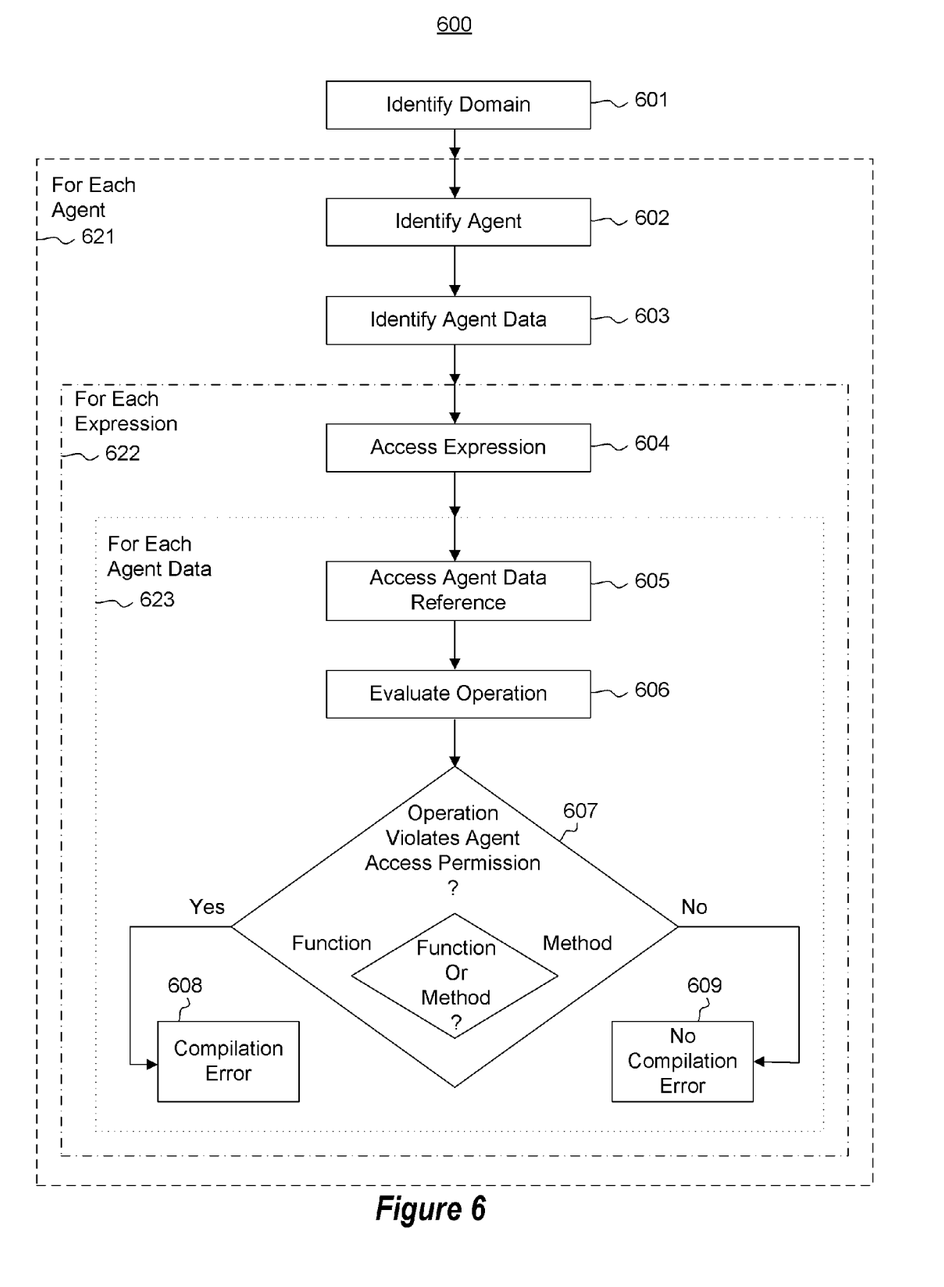
FIG. 6 illustrates a flowchart of a method for determining whether a reference to agent data in an agent function or method represents a compilation error.

FIG. 5 illustrates flowchart of a method 500 for the compiler to enforcing, at compile time, domain data access permissions on at least one agent to be created within the domain. The method may be performed for each domain data of the domain. The following is a code example that will be used as a simple example to explain the operation of FIG. 5. FIG. 5 may operate in the environment of FIG. 4. Accordingly, FIG. 5 will also be described with frequent reference to FIG. 4 and the following code example in which line number is added for clarity.

```
1.  domainD
2.  {
3.      int s1;
4.      constint s2 = 3;
5.      ...
6.      readeragent R : channel Ct
7.      {
8.          public R( )
9.          {
10.             parent.s1 += 1; // illegal, cannot modify state as
                    reader agent
11.         }
12.     }
13.     writeragent W : channel Ct
14.     {
15.         public W( )
16.         {
17.             parent.s1 += 1
18.         }
19.     }
20.     agent NA : channel Ct
21.     {
22.         public NA( )
23.         {
24.             int x = parent.s1 + 7; // illegal cannot access mutable
state as no-access agent
25.             int y = parent.s2 + 3;
26.         }
27.     }
28. }
```

The code examples provided herein are consistent with the Axum programming language. However, the principles described herein are not limited to any type of programming language.

Comparing this code example to the code 402 of FIG. 4, the domain creation reference 411 corresponds to the code of line 1, with the content of the domain being defined by the code between the opening bracket of line 2 and the closing bracket of line 28.

In the code example, one parameter (i.e., s1) of mutable domain data is created at line 3. One parameter (i.e., s2) of immutable domain data is created at line 4 and is initiated with a fixed value (i.e., s3). Line 5 represents that there may be other code outside of the agent creation references.

In this example, there are three agent creation references (which corresponds to agent creation reference 412A and two additional agent creation references 412B of FIG. 4).

Specifically, one agent creation reference (for creating a general reader agent) is defined in line 6, with the content of the agent being the content between the opening bracket at line 7 and the closing bracket at line 12. Line 8 represents that agent's constructor, with the expressions of the agent being represented as the content between the opening bracket at line 9 and the closing bracket at line 11. Accordingly, in the case of the general reader agent, there is only one expression at line 10. If the reader agent were, for example, agent creation reference 412A, then the expression at line 10 may be represented by the expression 413A of FIG. 4.

In the code example, a second agent creation reference (for creating a writer agent) is defined in line 13, with the content of the agent being the content between the opening bracket at line 14 and the closing bracket at line 19. Line 15 represents that agent's constructor, with the expressions of the agent being represented as the content between the opening bracket at line 16 and the closing bracket at line 18. Accordingly, in the case of the writer agent, there is only one expression at line 17. If the writer agent were, for example, agent creation reference 412A, then the expression at line 17 may be represented by the expression 413A of FIG. 4.

In the code example, a third agent creation reference (for creating an immutable reader agent) is defined in line 20, with the content of the agent being the content between the opening bracket at line 21 and the closing bracket at line 27. Line 22 represents that agent's constructor, with the expressions of the agent being represented as the content between the opening bracket at line 23 and the closing bracket at line 26. Accordingly, in the case of the immutable reader agent, there are two expressions, one at line 24, and another at line 25. If the immutable reader agent were, for example, agent creation reference 412A, then the expression at line 24 may be represented by the expression 413A of FIG. 4, while the expression at line 25 may be represented by the expression 413B of FIG. 4.

Thus, in the code example, there are four expressions, one at line 10, a second at line 17, a third at line 24, and a fourth at line 25. In each case, there is at least one reference to domain data. For example, the expressions at lines 10, 17 and 24, each references s1, which is defined as mutable domain data. The expression at line 24 references s2, which is immutable domain data.

Referring to FIG. 5, at compiled time, the compilation method identifies domain data of a domain to be created at runtime (act 501). For instance, in the code example, the domain to be created is domainD as represented in line 1, with s1 being mutable domain data, and s2 being immutable domain data. The method 500 may be performed for each of the data s1 and 2, perhaps concurrently. Acts 502 through 509 may be repeated for each agent defined in the domain (as represented by dashed-lined box 521). For instance, acts 502 through 509 may be performed for each of the three agents defined within the domain of the code example.

At compile time, an agent to be created within the domain at runtime is identified (act 502). For instance, in the code example, the compiler may identify three distinct agents that are to be created at runtime; namely, a general reader agent, a writer agent, and an immutable reader agent.

The domain access permissions of the agent are then identified with respect to the domain data (act 503). As previously disclosed, a general reader agent has read access to both mutable domain data and immutable domain data. In the code example, the general reader agent has read access to both s1 and s2. Furthermore, a writer agent has write access to mutable domain data and read access to the immutable domain data. Thus, the writer agent may write to or read from parameter s1, but only may read parameter s2. Finally, an immutable agent has read access to only the immutable domain data, and does not have any access to mutable domain data. Thus, the immutable agent can only read parameter s2.

The remaining portions of the method (acts 504 through 509) may be performed for each expression of the agent as represented by the dotted box 522. In the code example, each of the four expressions would be evaluated in the context of evaluating their corresponding agent. The expressions are accessed by the compiler (act 504). In the code example, each expression only has one domain data reference. However, if multiple domain data references were included within the expression, the remaining portions of the method (acts 505 through 509) may be repeated for each domain data reference as represented by the intermittent dashed-dotted box 523.

Specifically, the data reference is accessed (act 505). The compiler then evaluates the operation that the domain data reference would impose on the domain data upon evaluating the expression at runtime (act 506). The compiler then determines whether or not the operation is in violation of the domain access permissions of the agent with respect to the identified domain data (decision block 507). An example of the acts 504 through 507 will now be described with respect to the four distinct expressions in the first code example above.

Referring to the expression at line 10, the expression reads "parent.s1+=1". In the code example, expressions within an agent use a "parent" reference to indicate that the data is domain data, and not agent data. As will become more pertinent in the second code example further below, the "this" reference may be used in an agent expression to reference that agent data is being referred to. Thus, upon accessing this expression (act 504), the accessed "parent.s1" reference (act 505) is identified as a domain data reference referring to the mutable domain data s1 defined in line 3. The expression involves a write operation on the s1 domain data since the value is incremented by 1. Thus, the general reader agent is attempting to write to mutable domain data. This is not permitted (No in decision block 507).

In one embodiment, this determination may be made by assigning a "reader access" to the "parent" reference for general reader and immutable reader agents, and by furthermore assigning a "write access" to the "parent" reference for writer agents. Then, a "write access" is assigned to mutable domain data, and a "read access" is assigned to immutable domain data. Then, when traversing through the chain that defines the domain data, the most restrictive permission is taken as being the proper access permission. Thus, in the case of the general reader agent, the "parent" portion of the "parent.s1" string is read access, and the "s1" portion of the "parent.s1" string is write access. Thus, since the most restrictive of those permissions is read-access, the proper access permission for domain data s1 is determined to be read access. Thus, since the expression at line 10 attempts to write to domain data s1, the operation is illegal (Yes in decision block 507). Thus, a compiler error is indicated (act 508) for the expression at line 10. If an expression includes multiple data references, if a compilation error is found for any one of the multiple data references of the expression, a compilation error may occur for the expression as a whole. A visual indicator may provide a cue as to which data references caused the compilation error of the expression.

Referring to the expression at line 17, the expression also reads "parent.s1+=1", an identical expression to that of line 10, but with different context. Specifically, the expression is that of a writer agent. Upon accessing this expression (act 504), the accessed "parent.s1" reference (act 505) is identified as a domain data reference referring to the mutable domain data s1 defined in line 3. The expression involves a write operation on the s1 domain data since the value is incremented by 1. Thus, the writer agent is attempting to write to mutable domain data. This is permitted (No in decision block 507). For instance, in this case, the "parent" reference is assigned a "write access" since the agent is a writer agent. Furthermore, the "s1" reference is assigned a "write access" since the domain data s1 is mutable. Thus, the most restrictive access in the chain "parent.s1" is still write access. Since this operation is consistent with what the expression does to the domain data, the operation is permitted (No in decision block 507). Accordingly, the compiler determines that there is no compiler error (act 509) indicated in the expression of line 17.

Referring to the expression at line 24, the expression reads "int x=parent.s1+7". Upon accessing this expression (act 504), the accessed "parent.s1 " reference (act 505) is identified as a domain data reference referring to the mutable domain data s1 defined in line 3. The expression involves a read operation on the s1 domain data. Thus, the immutable agent is attempting to read from mutable domain data s1. This is not permitted (Yes in decision block 507). For instance, in this case, the "parent" reference is assigned a "read access" since the agent is a immutable reader agent. Furthermore, the "s1" reference is assigned a "no access" since the domain data s1 is mutable, but the agent is an immutable reader agent. Thus, the most restrictive access in the chain "parent.s1" is no access. Thus, an operation that requires a read of domain data s1 by an immutable agent is not permitted (Yes in decision block 507). Accordingly, the compiler indicates that there is an error (act 508) with respect to the expression of line 14.

Referring to the expression at line 25, the expression reads "int y=parent.s2+3". Upon accessing this expression (act 504), the accessed "parent.s2" reference (act 505) is identified as a domain data reference referring to the immutable domain data s2 defined in line 4. The expression involves a read operation on the s2 domain data. Thus, the immutable agent is attempting to read from immutable domain data. This is permitted (No in decision block 507). For instance, in this case, the "parent" reference is assigned a "read access" since the agent is an immutable reader agent. Furthermore, the "s2" reference is assigned a "read access" since the domain data s2 is immutable and the agent is an immutable reader agent. Thus, the most restrictive access in the chain "parent. s2" is read access. Thus, an operation that requires a read of domain data s2 by an immutable agent is permitted (No in decision block 507). Accordingly, the compiler finds no error (act 508) with respect to the expression of line 14.

Alternatively or in addition, the compiler may determine if an agent expression appropriate operates upon agent data. This may depend on whether the expression is within a function of an agent, or whether the expression is within a method of an agent. FIG. 6 illustrates a flowchart of a compilation method 600 for enforcing, at compile time, agent data access permissions at compile time on at least one agent to be created within a domain. The method 600 may be performed for each item of agent data. The following is a code example that will be used as an example to explain method 600 (with line numbering added for clarity):

```
1.    reader agent R : channel Ct
2.    {
3.        int s1;
4.        constint s2 = 3;
5.        public R( ) { }
6.        private int Foo1(int n)
7.        {
8.            this.s1 = n + 10;
9.            return this.s1;
10.       }
11.       private function int Foo2(int n)
12.       {
13.           this.s1 = n + 10; // illegal cannot access mutable state as
                               pure function
14.           return this.s2 + n;
15.       }
16.   }
```

The compiler identifies a domain to be created at runtime (act 601). Although not shown in the second code example, the code may include a domain creation reference similar to that represented by line 1 of the first code example. Accordingly, lines 1 through 16 of the second code example may appear within the opening and closing brackets of the domain creation reference.

The remaining portions of the method 600 may be repeated for each agent defined in the domain as represented by the box 621. The compiler identifies an agent to be created within the domain at runtime (act 602). In the second code example, however, there is only one agent defined in the domain. For instance, reader agent is created at line 1, with the content of the reader agent being defined as between the opening bracket of line 2, and the closing bracket of line 16.

The compiler also identifies the agent data of the agent (act 603). Here, the mutuable agent data is created at line 3 (i.e., having parameter name s1). Immutable agent data is created at line 4 (i.e., having parameter name s2, and being assigned value 3).

The remainder of the method 600 (acts 604 through 609) are performed for each expression within the agent as represented by box 622. In the case of the second code example, there are four expressions, one at line 8, and one at line 9, which each occurs within a method, and one at line 13 and one at line 14, which each occurs within a function.

For each expression, the expression is accessed (act 604). Then, the remaining portion of the method 600 (acts 605 through 609) are performed for each agent data reference as represented by the box 623. The agent data reference is accessed (act 605), and the compiler evaluates the operation that the agent data reference would impose on the agent data upon evaluating the expression at runtime (act 606). Then, the compiler determines whether or not the operation is in violation of access permissions of the with respect to the identified agent data (decision block 607). As represented by the decision block within decision block 607, this decision may depend on whether the expression occurs within a function or a method. In one embodiment, if the expression occurs in a function, the access permission is at most read access. If the expression occurs in a method, the access permission is at most write access. The access permission may also depend on the mutability characteristics of the agent data.

An example operation of acts 604 through 609 will now be described with respect to each of the four expressions of FIG. 6. The expression of line 8, (i.e., "this.s1=n+10") is accessed (act 604). The only data reference in the expression is "this.s1", which is accessed (act 605). In this case, this.s1 is being written to. Accordingly, the compiler identifies the operation as a write operation (act 606). Since the expression is within a method, the expression is permitted to write to agent state. Thus, the "this" reference is assigned "write access". Also, "s1" is mutable agent data. Accordingly, the "s1" reference is also assigned "write access". The string is evaluated to determine that the most restrictive access permission remains write access. Accordingly, since the operation to be performed on the agent data s1 (i.e., a write operation), is the same as the access permission (i.e., write access), the operation does not violate access permissions (No in decision block 607). Accordingly, there is no compilation error arising from this agent data reference (act 609).

The expression of line 9, (i.e., "return this.s1") is accessed (act 604). The only data reference in the expression is "this.s1", which is accessed (act 605). In this case, this.s1 is being simple read from. Accordingly, the compiler identifies the operation as a read operation (act 606). As previously mentioned, the string "this.s1" is evaluated to determine that the most restrictive access permission remains write access. Accordingly, since the operation to be performed on the agent data s1 (i.e., a read operation) is the implicit in the access permission (i.e., write access), the operation does not violate access permissions (No in decision block 607). Accordingly, there is no compilation error to this agent data reference (act 609).

The expression of line 13, (i.e., "this.s1=n+10") is accessed (act 604). The only data reference in the expression is "this.s1", which is accessed (act 605). In this case, this.s1 is being written to. Accordingly, the compiler identifies the operation as a write operation (act 606). Since the expression is within a function, the expression is not permitted to write to agent state. Thus, the "this" reference is assigned "read access". Also, "s1" is mutable agent data. Accordingly, the "s1 " reference is also assigned "write access". The string is evaluated to determine that the most restrictive access permission remains read access. Accordingly, since the operation to be performed on the agent data s1 (i.e., a write operation), is not consistent with the access permission (i.e., read access), the operation violates access permissions (Yes in decision block 607). Accordingly, there is a compilation error with respect to this agent data reference (act 608).

The expression of line 14, (i.e., "return this.s2+n") is accessed (act 604). The only data reference in the expression is "this.s2", which is accessed (act 605). In this case, this.s2 is being simple read from. Accordingly, the compiler identifies the operation as a read operation (act 606). The string "this.s2" is evaluated as including a "this" references that is read access (since the expression occurs within a function), and the "s2" reference is also a read access since s2 is an immutable parameter. Accordingly, the most restrictive access permission in the string is read access. Since this is the same as the operation of the expression requires, the operation does not violate access permissions (No in decision block 607). Accordingly, there is no compilation error to this agent data reference (act 609).

Accordingly, the principles described herein permit for a compiler to identify potential errors that may occur at runtime due to operations of an agent that exceed the access permissions of the agent when accessing domain data and/or agent data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hardware storage device having stored thereon computer-executable instructions that, when executed by one or more processors of the computing system, cause the computing system to instantiate a compiler, the compiler configured to perform a method for enforcing, at compile time, domain data access permissions at compile time on at least one agent to be created within the domain, the method comprising:
   an act of identifying domain data of a domain to be created at runtime;
   an act of identifying an agent to be created within the domain at runtime;
   an act of identifying domain access permissions of the agent with respect to the identified domain data;
   an act of accessing an expression of the agent;
   an act of accessing a reference to the domain data within the expression;
   an act of evaluating an operation that the reference to the domain data would impose on the domain data upon evaluating the expression at runtime; and
   an act of determining whether or not the operation is in violation of the domain access permissions of the agent with respect to the identified domain data.

2. The hardware storage device in accordance with claim 1, wherein if the act of determining determines that the operation is in violation of the domain access permissions of the agent with respect to the identified domain data, the method further comprises:
   an act of indicating that the operation constitutes a compilation error.

3. The hardware storage device in accordance with claim 1, wherein if there are one or more other references to the domain data within the expression, the method further comprises the following for each of the one or more other references to the domain data within the expression:
   an act of evaluating a corresponding operation that the corresponding reference to the domain data would impose on the domain data upon evaluating the expression at runtime; and
   an act of determining whether or not the corresponding operation is in violation of the domain access permissions of the agent with respect to the identified domain data.

4. The hardware storage device in accordance with claim 1, wherein if there are one or more other expressions of the agent that include one or more references to the domain data within the corresponding expression, the method further comprises the following for each of the one or more references to the domain data within the corresponding expression for each of the corresponding one or more other expressions:
   an act of evaluating a corresponding operation that the corresponding reference to the domain data would impose on the domain data upon evaluating the corresponding expression at runtime; and
   an act of determining whether or not the corresponding operation is in violation of the domain access permissions of the agent with respect to the identified domain data.

5. The hardware storage device in accordance with claim 1, wherein the domain access permission of the agent is a function of a type of the agent.

6. The hardware storage device in accordance with claim 5, wherein the domain access permission of the agent is a writer agent in which the domain access permission is no greater than a write access permission of the domain data.

7. The hardware storage device in accordance with claim 6, wherein the domain access permission of the agent is also a function of a mutability characteristic of the domain data, wherein if the domain data is mutable, the domain access permission of the agent is write access.

8. The hardware storage device in accordance with claim 6, wherein the domain access permission of the agent is also a function of a mutability characteristic of the domain data, wherein if the domain data is immutable, the domain access permission of the agent is read access.

9. The hardware storage device in accordance with claim 5, wherein the domain access permission of the agent is a general reader agent in which the domain access permission is no greater than read access permission of the domain data.

10. The hardware storage device in accordance with claim 5, wherein the domain access permission of the agent is a immutable reader agent in which the domain access permission is no greater than a read access permission of the domain data.

11. The hardware storage device in accordance with claim 10, wherein the domain access permission of the agent is also a function of a mutability characteristic of the domain data, wherein if the domain data is mutable, the domain access permission of the agent is no access.

12. The hardware storage device in accordance with claim 10, wherein the domain access permission of the agent is also a function of a mutability characteristic of the domain data, wherein if the domain data is immutable, the domain access permission of the agent is read access.

13. The hardware storage device in accordance with claim 1, wherein the domain access permission of the agent is also a function of a mutability characteristic of the domain data.

14. A hardware storage device having stored thereon computer-executable instructions that, when executed by one or more processors of the computing system, cause the computing system to instantiate a compiler, the compiler configured to perform a method for enforcing, at compile time, agent data access permissions at compile time on at least one agent to be created within a domain, the method comprising:
   an act of identifying a domain to be created at runtime;
   an act of identifying an agent to be created within the domain at runtime;
   an act of identify agent data of the agent;
   an act of accessing an expression of the agent;
   an act of determining whether the expressions occurs within a function or a method;
   an act of accessing a reference to the agent data within the expression;
   an act of evaluating an operation that the reference to the agent data would impose on the agent data upon evaluating the expression at runtime; and
   an act of determining whether or not the operation is in violation of access permissions of the with respect to the identified agent data, wherein the access permissions depend on whether the expression occurs within a function or a method.

15. The hardware storage device in accordance with claim 14, wherein if the expression occurs in a function, the access permission is at most read access.

16. The hardware storage device in accordance with claim 15, wherein if the expression occurs in a method, the access permission is at most write access.

17. The hardware storage device in accordance with claim 14, wherein if the expression occurs in a method, the access permission is at most write access.

18. The hardware storage device in accordance with claim 14, wherein the access permission also depends on a mutability characteristics of the agent data.

19. A method for enforcing, at compile time, domain data access permissions at compile time on a plurality of agents to be created within the domain at runtime, the method comprising the following for each of the plurality of agents:
   an act of identifying domain data of a domain to be created at runtime;
   an act of identifying a corresponding agent to be created within the domain at runtime;
   an act of identifying domain access permissions of the corresponding agent with respect to the identified domain data, wherein the plurality of agents have at least two different types of domain access permissions with respect to the identified domain data;
   an act of accessing one or more expressions of the corresponding agent;
   for each of the one or more expressions of the corresponding agent, an act of accessing one or more references to the domain data within the corresponding expression;
   for each of one or more references to the domain data in each of the one or more expressions of the corresponding agent, performing the following:
      an act of evaluating an operation that the corresponding reference to the domain data would impose on the domain data upon evaluating the corresponding expression at runtime; and
      an act of determining whether or not the corresponding operation is in violation of the domain access permissions of the agent with respect to the identified domain data.

20. The method in accordance with claim 19, wherein if any of the corresponding operations on the domain data are in violation of the domain access permissions of the agent, the compiler indicates that the operation constitutes a compilation error.

* * * * *